(12) United States Patent
Yang

(10) Patent No.: US 8,410,799 B2
(45) Date of Patent: Apr. 2, 2013

(54) MOTION SENSING DEVICE AND ELECTRONIC DEVICE USING THE SAME

(75) Inventor: Song-Ling Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 358 days.

(21) Appl. No.: 12/954,684

(22) Filed: Nov. 26, 2010

(65) Prior Publication Data

US 2012/0019269 A1    Jan. 26, 2012

(30) Foreign Application Priority Data

Jul. 20, 2010 (CN) .......................... 2010 1 0231574

(51) Int. Cl.
*G01R 27/08* (2006.01)
(52) U.S. Cl. ........................................................ 324/691
(58) Field of Classification Search .................. 324/691, 324/762.01–762.1, 750.01–750.3; 257/48; 438/14–18; 702/150
See application file for complete search history.

(56) References Cited

U.S. PATENT DOCUMENTS 7,356,439 B2 *  4/2008  Jung .............................. 702/150
7,689,378 B2 *  3/2010  Kolen ........................... 702/150

* cited by examiner

*Primary Examiner* — Tung X Nguyen

(74) *Attorney, Agent, or Firm* — Altis Law Group, Inc.

(57) ABSTRACT

A motion sensing device includes a housing defining a chamber that includes a number of sidewalls. A number of movable members are connected to the sidewalls and able to move toward the sidewalls. Each movable member includes a number of conductive grooves opposing the sidewalls and having a resistance layer. A number of conductive spring members are respectively fixed to the sidewalls and each include a free end movably received in one conductive groove. An inertial weight is movably received in a space defined by the movable members. When the motion sensing device is jerked, the inertial weight moves and is able to apply a pushing force to one of the movable members, causing one of the movable members to move and causing two of the free ends in the same conductive groove to move toward each other.

8 Claims, 5 Drawing Sheets

MOTION SENSING DEVICE AND ELECTRONIC DEVICE USING THE SAME

BACKGROUND

1. Technical Field

The present disclosure relates to a motion sensing device.

2. Description of Related Art

An acceleration sensor can be used to detect the motion of an electronic device, such as a cell phone. However, in certain circumstance, only the movement direction of an electronic device is needed. It is not cost effective if an acceleration sensor is used in such circumstance.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
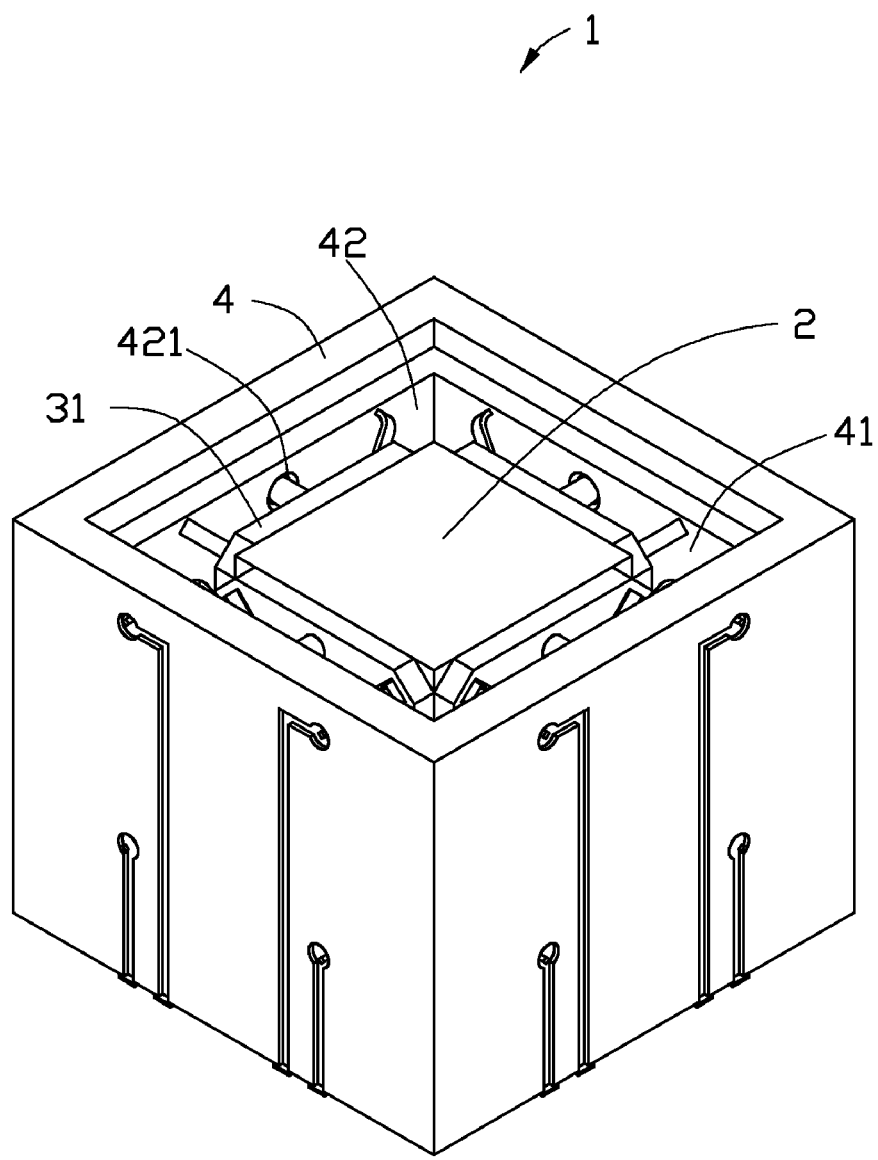
FIG. 1 is an isometric view of a motion sensing device in accordance with one embodiment.

Referring to FIG. 1, a motion sensing device 1 includes a housing 4, a number of movable members 31, and an inertial weight 2. The housing 4 is hollow and defines a chamber 41 including a number of sidewalls 42. Each movable member 31 is movably connected to one sidewall 42. The inertial weight 2 is received in the space defined by the movable members 31. In the embodiment, the inertial weight 2 stays in contact with the movable members 31. When the motion sensing device 1 is jerked, the inertial weight 2 moves in a direction opposite to the moving direction of the motion sensing device 1, which pushes one or more of the movable members 31 to move.

Figure 2:
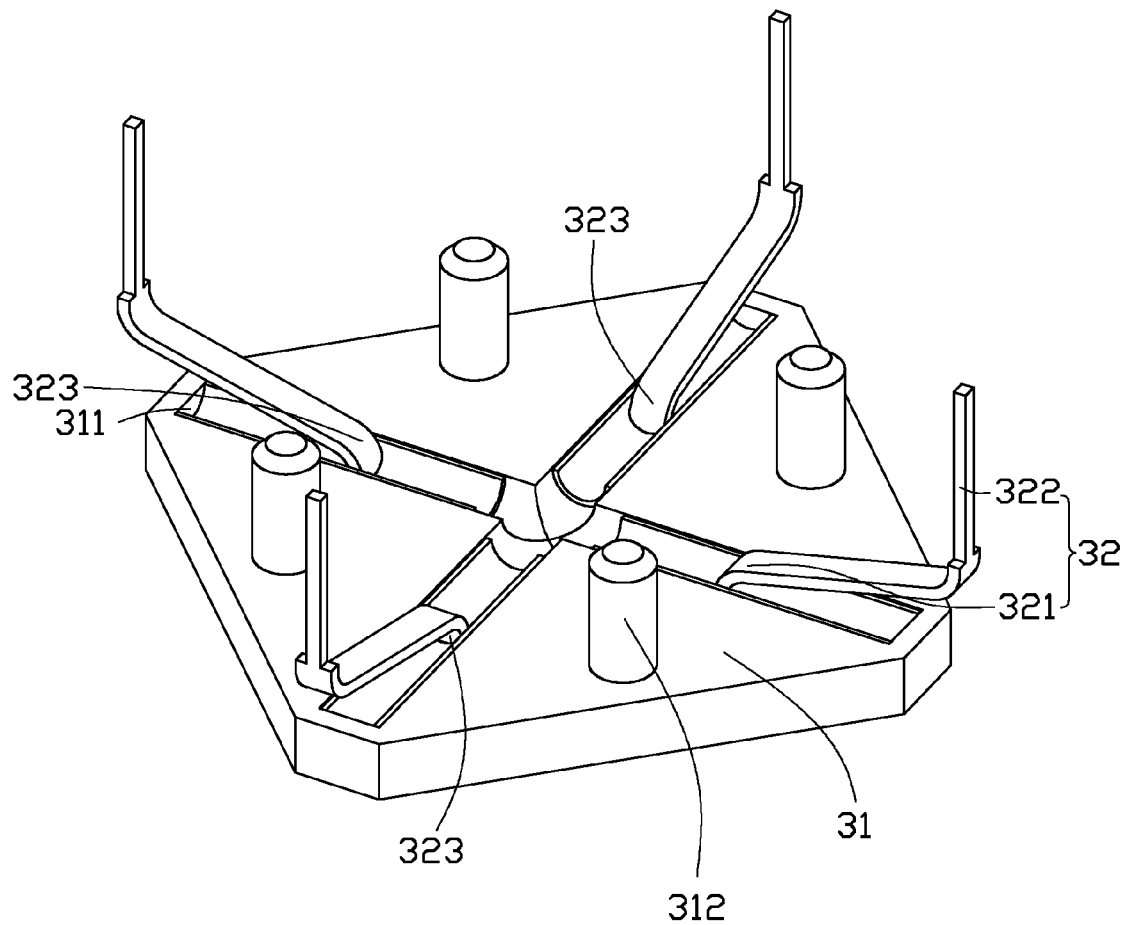
FIG. 2 is an isometric view of a movable member and a number of spring members of the motion sensing device of FIG. 1.

Referring to FIG. 2, each movable member 31 defines a number of conductive grooves 311. In the embodiment, the number of the grooves 311 is two. The two grooves 311 intersect with each other. Each groove 311 has a uniform resistance layer. In the embodiment, each movable member 31 also includes a number of posts 312 partly received in holes 421 formed in the sidewalls 42 of the housing 4, allowing the movable members 31 to move toward or away from the sidewalls 42.

Figure 3:
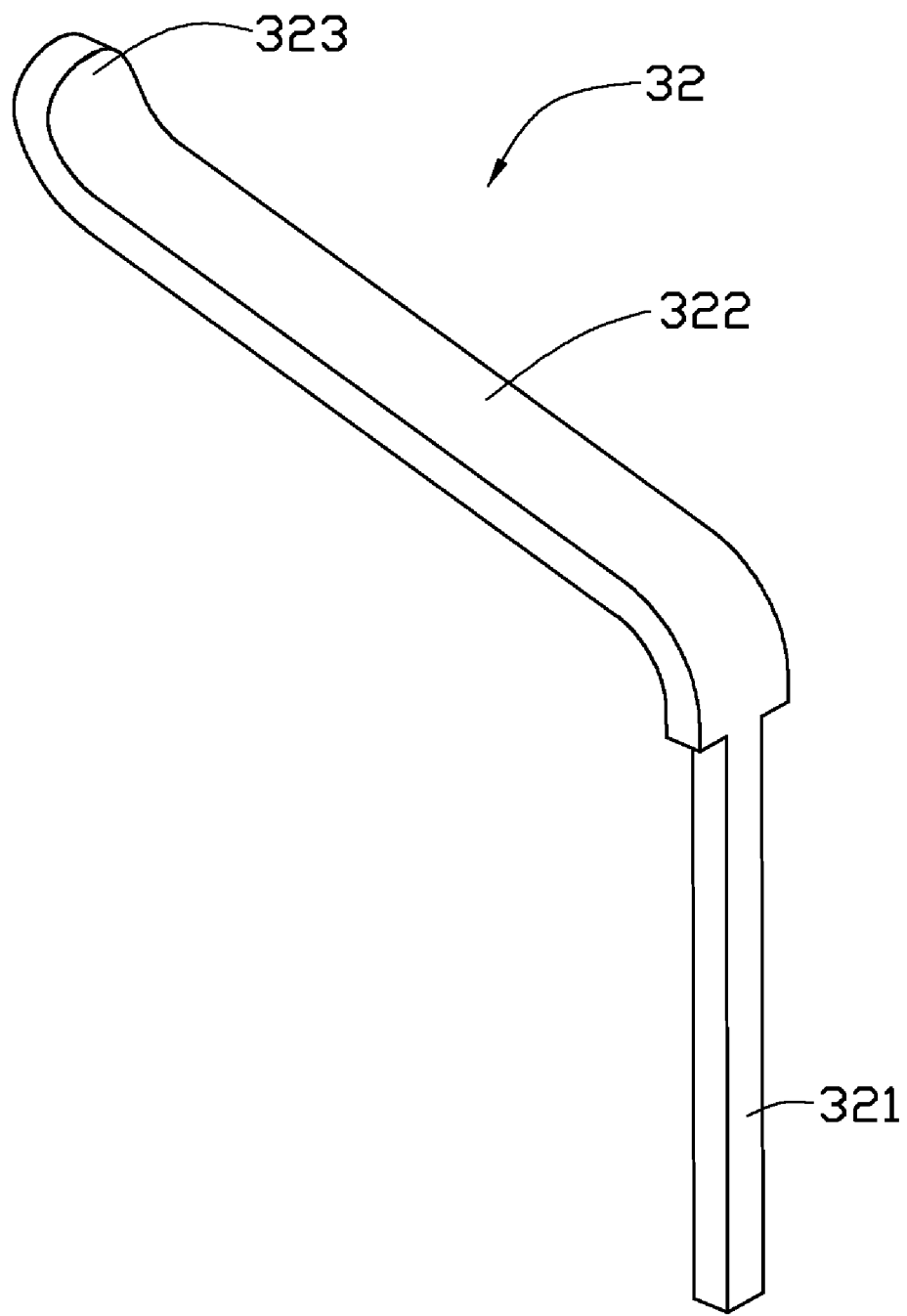
FIG. 3 is an isometric view of one of the spring members of FIG. 2.

The motion sensing device 1 further comprises a number of sets of conductive spring members 32. Each set of spring members 32 is fixed to one sidewall 42. In the embodiment, each set of spring members 32 includes four spring members 32. Referring to FIG. 3, each spring member 32 includes a base 321 and an inclined portion 322. The base 321 is fixed to the one sidewall 42 of the housing 40. The inclined portion 322 includes a free end 323 received in one of the grooves 311. When one movable member 31 is pushed to move, the corresponding free ends 323 are caused to move toward each other along the grooves 311. The distance between the two free ends 323 in the same conductive groove 311 become smaller. The resistance value between the two free ends 323 in the same conductive groove 311 also becomes smaller. By identifying the changes of the resistance value between the free ends 323, the motion of the movable member 31 can be detected. The moving direction of the motion sensing device 1 that is opposite to the moving direction of the movable member 31 can also be detected.

Figure 4:
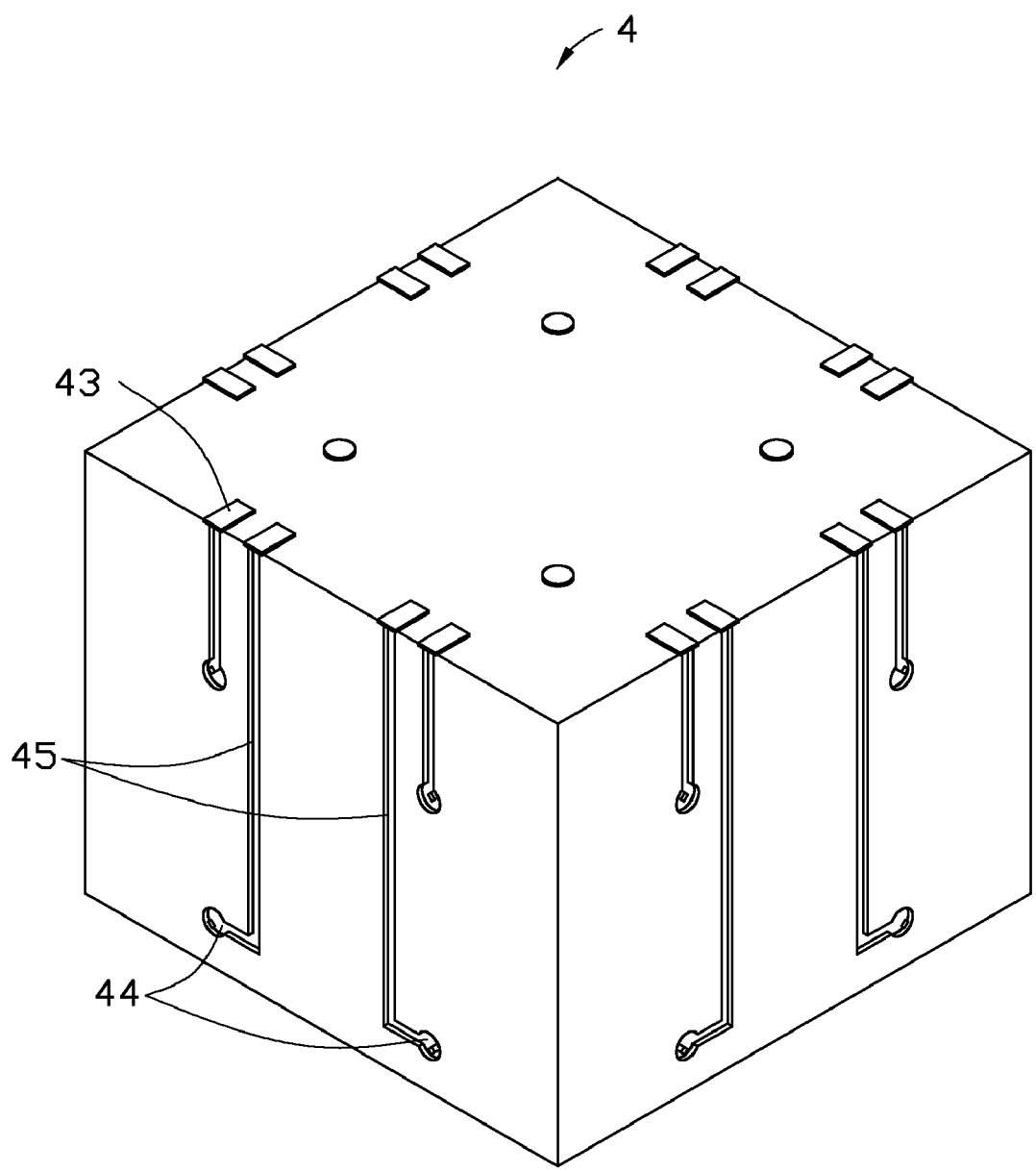
FIG. 4 is an isometric view of a motion sensing device of FIG. 1 viewed from another perspective.

Referring to FIG. 4, the bottom of the housing 40 includes a number of contacts 43. Each outer sidewall of the housing 40 defines a number of holes 44 and includes a number of conductive channels 45 respectively connecting one contact 43 and one spring member 32.

Figure 5:
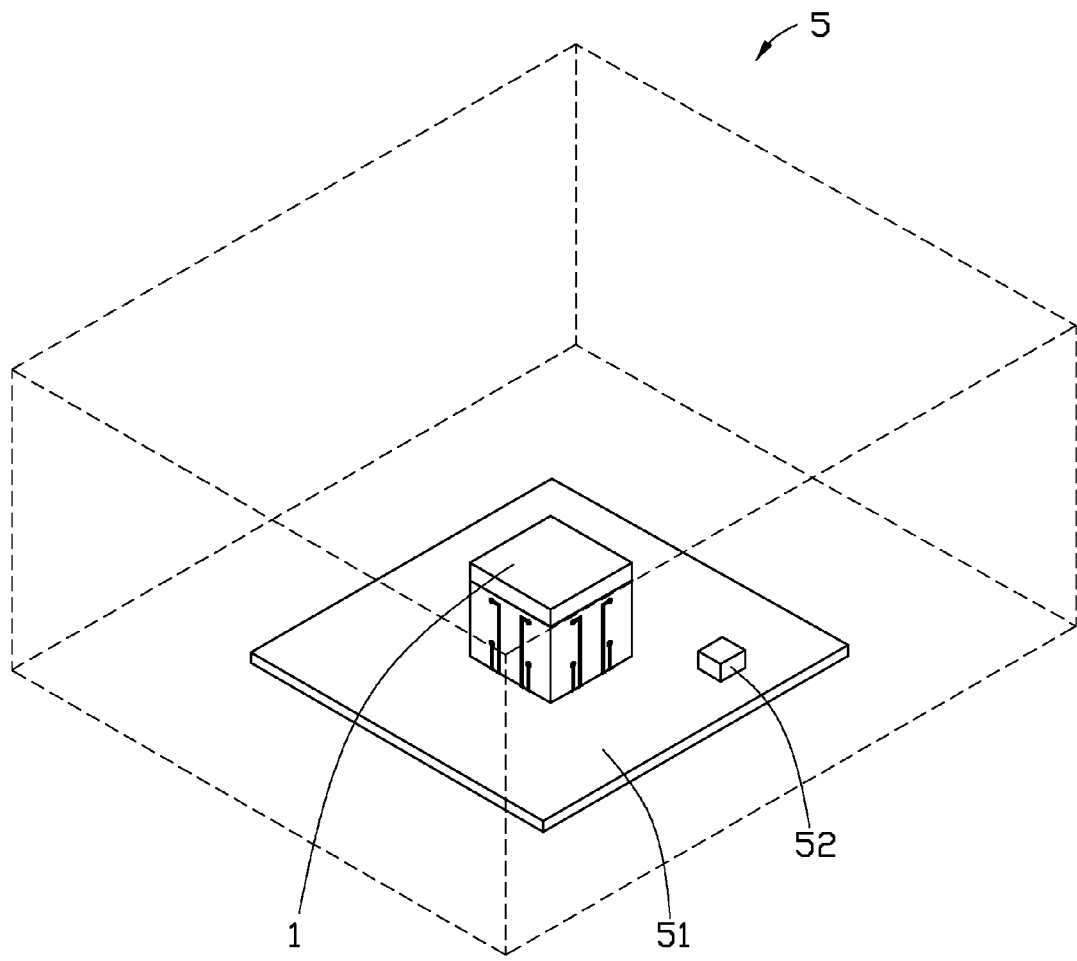
FIG. 5 shows an electronic device using the motion sensing device of FIG. 1.

Referring to FIG. 5, when used in an electronic device 5, the motion sensing device 4 is fixed to a circuit board 51 of the electronic device 5. The contacts 43 of the motion sensing device 4 are electrically connected to respective pins of a controller 52 of the electronic device 5. When the electronic device 5 is jerked along a direction substantially perpendicular to one of the sidewalls 42, one movable member 31 is caused to move toward the sidewall 42 opposing the movable member 31. The spring member 32 between the movable member 31 and the sidewall 42 is caused to deform, causing the free ends 323 to move toward each other. The resistance between each two free ends 323 thus becomes smaller. The controller 52 can identify the change of the resistance between each two free ends 323 based on the changes of the current flowing through the spring members 32, and can then determine that the moving direction of the electronic device 5 is opposite to the moving direction of the movable member 31.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A motion sensing device comprising:
    a housing defining a chamber, the chamber comprising a plurality of sidewalls;
    a plurality of movable members, each movably connected to one of the plurality of sidewalls and able to move toward or away from the one of the plurality of sidewalls, and comprising at least one conductive groove facing the one of the plurality of sidewalls and having a resistance layer;
    a plurality of conductive spring members respectively fixed to the plurality of sidewalls and each comprising a free end movably received in one of the at least one conductive groove; and
    an inertial weight movably received in a space defined by the movable members, wherein when the motion sensing device is jerked, the inertial weight moves and is able to apply a pushing force to one of the plurality of movable members, causing one of the plurality of movable members to move and causing at least two of the free ends of the plurality of conductive spring members in a same one of the at least one conductive groove to move toward each other, causing a resistance value change between the at least two of the free ends, which is able to be detected to determine a movement direction of the housing that is opposite to the movement direction of the one of the plurality of movable members.

2. The motion sensing device according to claim 1, wherein each movable member comprises a plurality of posts, each of the plurality of sidewalls defines a plurality of holes to receive the plurality of posts, allowing the movable members to move relative to the sidewalls.

3. The motion sensing device according to claim 1, wherein each of the plurality of conductive spring members comprises a base and a inclined portion and is able to be elastically deformed.

4. The motion sensing device according to claim 1, wherein the housing includes a bottom comprising a plurality of contacts respectively connected to the plurality of conductive spring members.

5. An electronic device comprising:
  a motion sensing device comprising:
    a housing defining a chamber, the chamber comprising a plurality of sidewalls;
    a plurality of movable members each movably connected to one of the plurality of sidewalls and able to move toward or away from the one of the plurality of sidewalls, and comprising at least one conductive groove facing the one of the plurality of sidewalls and having a resistance layer;
    a plurality of conductive spring members respectively fixed to the plurality of sidewalls and each comprising a free end movably received in the at least one conductive groove;
    an inertial weight movably received in a space defined by the movable members, wherein when the motion sensing device is jerked, the inertial weight moves and is able to apply a pushing force to one of the plurality of movable members, causing one of the plurality of movable members to move and causing at least two of the free ends in the same one of the at least one conductive groove to move toward each other; and
  a controller to detect a change of resistance value between at least two of the free ends in the same one of the at least one conductive groove, and to determine a movement direction of the housing that is opposite to the movement direction of the one of the plurality of movable members.

6. The electronic device according to claim 5, wherein each movable member comprises a plurality of posts, each of the plurality of sidewalls defines a plurality of holes to receive the plurality of posts, allowing the movable members to move relative to the sidewalls.

7. The electronic device according to claim 5, wherein each of the plurality of conductive spring members comprises a base and a inclined portion and is able to be elastically deformed.

8. The electronic device according to claim 5, wherein the housing includes a bottom comprising a plurality of contacts respectively connected to the plurality of conductive spring members.

\* \* \* \* \*